Figure 1:
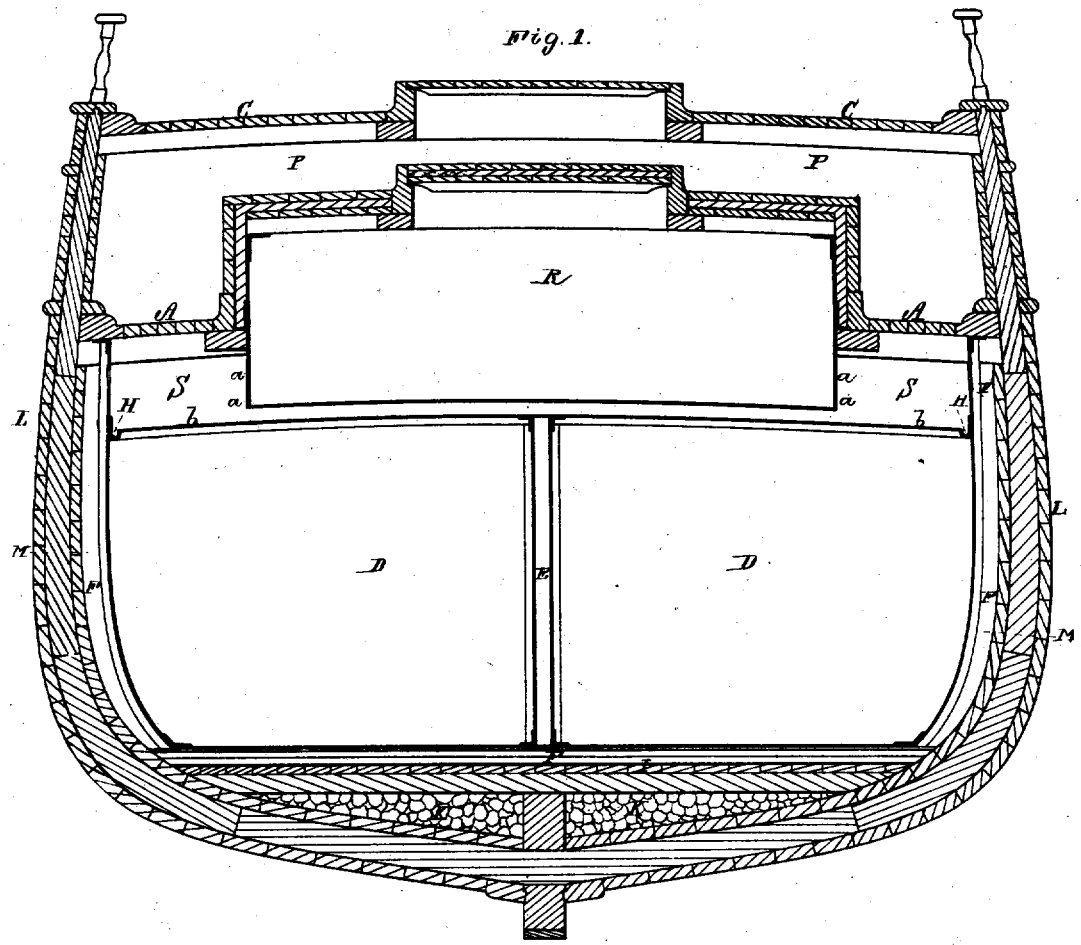

J. F. BALDWIN.

REFRIGERATOR-SHIPS.

No. 7,872. Reissued Sept. 4, 1877.

Witnesses.

S. N. Piper

L. W. Miller.

Inventor

Joseph F. Baldwin by his attorney

R. H. Eddy

N. PETERS, PHOTO-LITHOGRAPHER, WASHINGTON, D. C.

UNITED STATES PATENT OFFICE.

JOSEPH F. BALDWIN, OF CHELSEA, MASSACHUSETTS.

IMPROVEMENT IN REFRIGERATOR-SHIPS.

[Specification forming part of Letters Patent No. 92,246, dated July 6, 1869; Reissue No. 7,872, dated September 4, 1877; application filed January 19, 1877.

*To all whom it may concern:*

Be it known that I, JOSEPH F. BALDWIN, of Chelsea, of the county of Suffolk and State of Massachusetts, have made a new and useful invention or Improvement in Navigable Vessels, such being for the preservation of vegetable or animal matters therein or on shipboard; and I do hereby declare the same to be described in the following specification and represented in the accompanying drawing, which denotes a vertical and transverse section of the hull of a navigable vessel as provided with my invention.

The object I have had in view in making such invention is to produce a navigable vessel advantageously capable of preserving from decay, during a voyage, fruits, vegetables, or various other articles of a perishable nature.

In carrying out my invention I erect one or more chambers or apartments, B, between the lower deck *b* and the poop C, such chamber or chambers being intended for receiving and holding ice in blocks.

Each ice-receptacle is a structural part of the vessel, and is provided with one or more openings for the entrance of air and escape of water which passes from the receptacle above the top *b* of the main cargo-chamber, which is divided into two compartments, D D, by a central vertical air-space, E.

Below the main-deck A is a refrigerating-chamber, S S, which is maintained at a low temperature by the ice in the receptacle within the chamber, and at opposite sides of the said chamber are air-spaces F F.

At each side of the deck *b* is a gutter or channel, H, to receive the water that may escape from the ice-receptacle B and be discharged on the deck *b*, which slopes from its middle toward the gutters. These gutters may discharge the water through scuppers or into one or more cisterns or tanks.

The floor I of the hold I make water-tight, and arrange beneath it a space, K, for holding ballast.

The ice-receptacle is so constructed that the heat of the air around it may not pass within the same, the space P between the upper and main decks forming a non-conducting chamber above the ice-receptacle, and preventing the rays of the sun from passing below the upper deck and the melting of the ice with the rapidity that would otherwise take place.

There should be suitable hatchways or openings into the ice and cargo receptacles for the purpose of introducing ice or cargo therein, or removing such therefrom, as occasion may require, such openings being provided with proper hatches or covers.

When a vessel is constructed as above specified, and the ice-receptacle is duly charged with ice, and the hold or tanks therein are supplied with fruit, or vegetable or animal matters, which, by being kept in a cool state, will be preserved from decay or decomposition, it will be seen that the air in each space S between the decks A and *b* will be cooled by the ice, and will pass into the spaces about and between the cargo tanks or chambers, and thus will cool them by abstracting heat from their sides, and thence from the air that may be within such chambers, and thus will operate to keep the contents of the chambers at a low temperature, or one which will protect them from decay.

The air-spaces next the sides and bottoms of the cargo-receptacles so insulate them from the sides of the hull as to prevent the heat of the hull or the water in which it may float from being absorbed by the walls or sides of the chambers. The water-tight flooring also serves to prevent any water that may leak into the ballast hold or space from coming in contact with the floors of the cargo-chambers.

Quicklime or other proper absorbent may be used in each of the cargo-compartments to absorb any moisture that may be generated therein by what is termed "sweating" of the fruit.

The employment of a poop and chamber, P, over the ice-receptacle protects it from the rays of the sun and the power of such to heat it, and thereby melt the ice.

I claim as my invention the following—that is to say:

1. A navigable vessel provided with an ice-receptacle, forming a structural part of said vessel, the space between the main and upper decks constituting the non-conducting space above the ice-receptacle, and the space immediately below the main-deck constituting the refrigerating-chamber.

2. The combination, in a navigable vessel, of the main-deck A, the upper deck C, and ice-receptacle B, forming a structural part of the vessel, and the refrigerating-chamber S S below the main-deck, all substantially as set forth.

3. The combination, in a navigable vessel, of the chamber S S below the main-deck, chamber P between the main and upper decks, and ice-receptacle B, the same being protected by the chamber P, substantially as set forth.

4. The combination, with the decks A C *b*, inclosing chambers P S S, of the air-spaces F at the sides of the chamber S S, as set forth.

5. The combination, with the hull of a navigable vessel, and with an ice-receptacle, B, and one or more refrigerating-chambers arranged between-decks in such hull, of the air-chamber P extending over the ice-receptacle and refrigerating-chamber, for the purpose set forth.

6. The combination, substantially as described, of the hull L, decks A C, ice-receptacle B, and cargo-chamber D D below the ice-receptacle and extending below the water-line.

7. The combination, substantially as described, of the water-tight flooring I and ballast-receptacle K in the hull, with the cargo and ice receptacles and air-spaces F.

JOSEPH F. BALDWIN.

Witnesses:

R. H. EDDY,

J. R. SNOW.